(12) United States Patent
Nielsen

(10) Patent No.: US 6,241,329 B1
(45) Date of Patent: Jun. 5, 2001

(54) MODULAR FURNITURE WITH COVERED WIRING PASSAGE

(75) Inventor: Andreas K. Nielsen, Valley Center, CA (US)

(73) Assignee: Aspen Furniture, Inc., Phoenix, AZ (US)

( * ) Notice: Subject to any disclaimer, the term of this patent is extended or adjusted under 35 U.S.C. 154(b) by 0 days.

(21) Appl. No.: 09/372,901

(22) Filed: Aug. 12, 1999

(51) Int. Cl.[7] ................................................... A47B 81/00
(52) U.S. Cl. .................. 312/107; 312/265.6; 312/223.6; 403/381; 108/50.02
(58) Field of Search ..................... 312/107, 108, 312/111, 194, 195, 196, 198, 208.1, 265.5, 265.6, 223.3, 223.6, 223.4, 223.5, 291, 208.3; 108/50.01, 50.02, 64; 403/331, 381

(56) References Cited

U.S. PATENT DOCUMENTS

| | | | |
|---|---|---|---|
| 1,299,506 | * 4/1919 | Phillips | 312/223.4 |
| 1,892,415 | * 12/1932 | Ulrich | 312/208.1 X |
| 4,066,305 | * 1/1978 | Gazarek | 312/265.6 X |
| 4,884,513 | * 12/1989 | Newhouse et al. | 312/195 X |
| 5,071,204 | * 12/1991 | Price et al. | 312/223.3 X |
| 5,094,514 | * 3/1992 | Grosch | 312/233 X |
| 5,186,425 | 2/1993 | Keusch et al. | |
| 5,328,260 | 7/1994 | Beirise | |
| 5,451,101 | 9/1995 | Ellison et al. | |
| 5,467,703 | * 11/1995 | Crinion | 312/223.6 X |
| 5,568,773 | 10/1996 | Hung | |

FOREIGN PATENT DOCUMENTS

| | | | |
|---|---|---|---|
| 2716941 | * 10/1978 | (DE) | 312/223.6 |
| 567869 | * 10/1957 | (IT) | 108/64 |

* cited by examiner

Primary Examiner—Janet M. Wilkens
(74) Attorney, Agent, or Firm—William R. Bachand; Squire, Sanders & Dempsey, L.L.P.

(57) ABSTRACT

Arrangements of modular furniture may be set in place and computer equipment may then be cabled together without moving any module of the arrangement. Modules include a base having file storage, a base having computer power controls, and a base supporting a desk. Each module may provide a wiring access opening on each side to define an aligned wiring passage through as many base modules as needed for a particular arrangement. Exposed wiring access openings may be disguised by a sliding plate that completes the trim of the base, covers the opening, and conceals the fact that an opening exists.

21 Claims, 7 Drawing Sheets

MODULAR FURNITURE WITH COVERED WIRING PASSAGE

FIELD OF THE INVENTION

Embodiments of the present invention relate to modular furniture for use with electronic equipment and particularly to wiring passages between modules.

BACKGROUND OF THE INVENTION

Office and home-office furniture typically supports a computer system, entertainment system, or communication system formed from electronic equipment cabled together and cabled to utility receptacles for access to facility wiring for power, telephone, video, radio, intercom, security, and data networks. With interest in offices located in residences, there is a growing demand for office furniture that is finished to coordinate with residential furniture. Conventional wiring passages and covers detract from the aesthetic finish of known office furniture of the type amendable to coordination with residential furniture. Without an aesthetically pleasing and practically functional furniture module having a wiring passage and cover, the market for home-office furniture cannot be fully satisfied.

SUMMARY OF THE INVENTION

Solving the problems presented above, a furniture system, according to various aspects of the present invention, includes several furniture modules arranged with one abutting the next. Each module includes a first outer surface and a second outer surface, each outer surface having a respective channel and a respective aperture located within the respective channel. Each interface between abutting modules comprises at least two outer surfaces positioned to align respective apertures of the outer surfaces for passage of cabling between modules of the system. The system also includes several covers each slidingly engaged in a respective outer surface not included at any interface to conceal the respective aperture.

Covering an aperture with a sliding cover may eliminate the need for fasteners to keep the cover in place and may eliminate from view any indication that the aperture exists behind the cover. The exposed lines of the channel may be incorporated into the trim design of the furniture, providing an integral appearance.

BRIEF DESCRIPTION OF THE DRAWING

Embodiments of the present invention will now be further described with reference to the drawing, wherein like designations denote like elements, and.

DETAILED DESCRIPTION OF PREFERRED EMBODIMENTS

Figure 1:
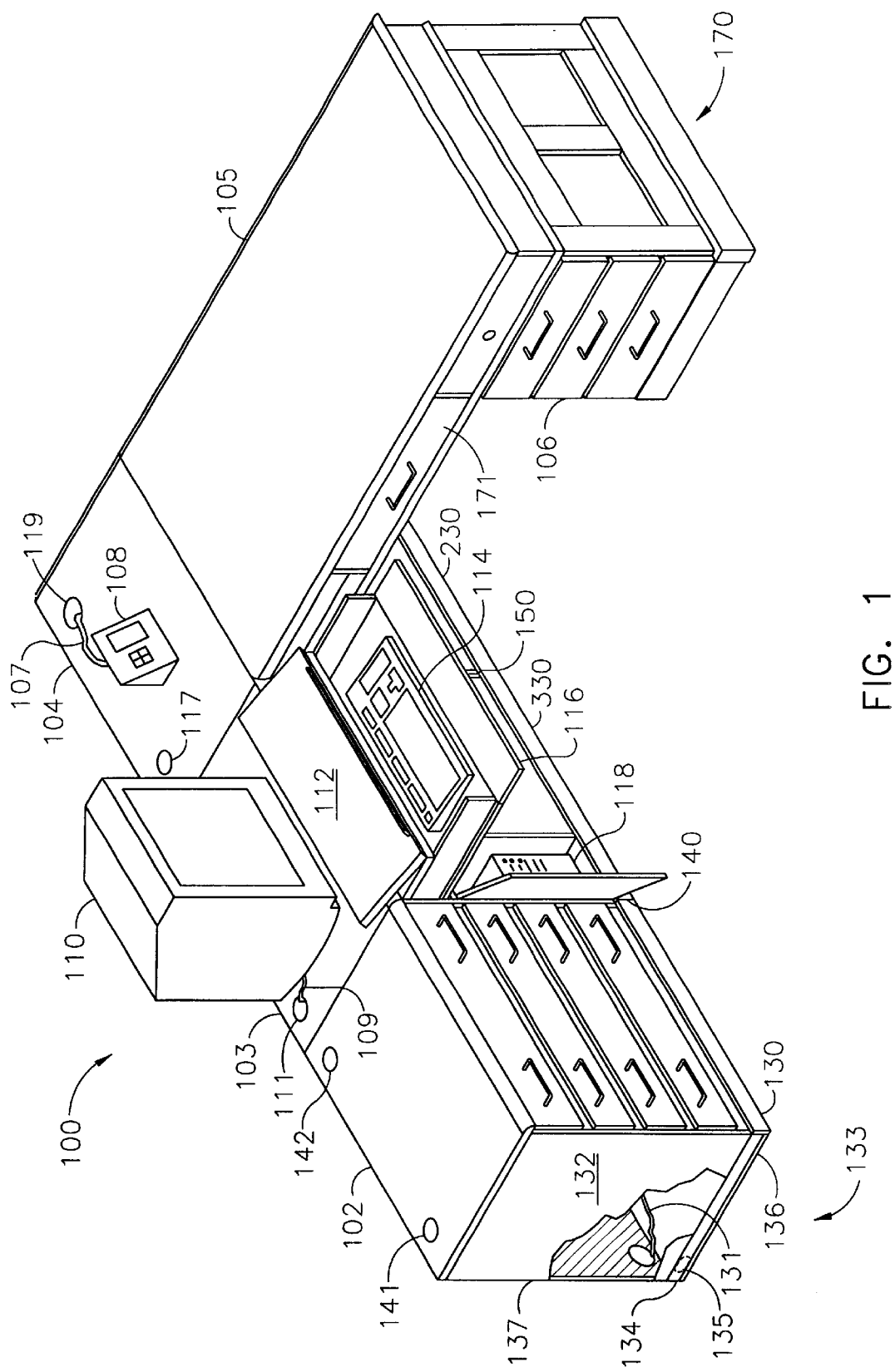
FIG. 1 is a perspective plan view of a furniture system according to various aspects of the present invention.

A modular furniture system of the present invention provides a wiring passageway between modules; yet, when fully assembled, provides an overall finished, aesthetic appearance. Furniture systems for office and home-office applications typically provide storage (e.g., for business records, papers, books, office tools, etc.) and an operating environment for operating a system of interconnected electronic equipment (e.g., computer systems, telephone and FAX systems, entertainment systems, etc.). Due to the wide variety of storage and operating environments, manufacturing and distribution costs may remain competitive by providing a few (e.g., 3 to 12) standard modules from which the consumer may mix and match to assemble a furniture system having a particular desirable combination of features. For example, furniture system 100 of FIGS. 1 and 2 includes 4 modules which may be arranged in any of over 20 configurations using 2, 3, or 4 of the modules in each configuration and arranging different sides of the modules in abutting relationship. Any surface through which a cable passageway might be needed is provided with a removable cover that when in place provides an aesthetic finished surface and when removed exposes an aperture for passage of cabling.

System 100 includes base 102 for file storage, base 103 for equipment support, base 104 for open storage, desk 105 usable from either side, and rolling drawer file 106. The modules of system 100 are assembled in a conventional manner of common materials used in furniture building (e.g., wood, wood products, laminated products, plastic, metal framework, metal drawer supports, hardware, etc.).

Base 102 includes footer 130, outer surface 132, and cover 134. As will be described in detail below, the exposed side 133 of base 102 includes side panel 137 and block 136. An aperture 135 in side panel 137 is covered by cover 134. The side of base 102 opposite exposed side 133 (not shown) is constructed in an identical manner with an aperture and provision for a cover; however, such a cover is omitted when cabling (e.g., power cords, wiring, or signal cables) must pass between base modules 102 and 103 to complete the installation of system 100.

Base 103 supports computer equipment including a monitor 110, keyboard 114, and power controller 118. Base 103 includes footer 330, tray 116, and lid 112. Base 103 includes sides (see FIG. 3) identical in structure to exposed side 133 discussed above except that covers for apertures in sides of base 103 are omitted. Cable 109 passes through hole 111 to connect to computer chassis 202 located in base 104 (see FIG. 2). Power cable 131 from power controller 118 passes through aligned apertures at interface 140 to connect to a wall mounted receptacle located (for purposes of this discussion) behind base 102. As shown in FIG. 3, side 333 includes surface 332 that abuts a similar outer surface of base 104. Surface 332 includes side panel 337 and block 336. With cover omitted, aperture 335 is open for passage of cabling.

Tray 116 and lid 112 may be of the type described in U.S. patent application Ser. No. 09/264,469 to Andreas K. Nielsen, filed Mar. 8, 1999 and incorporated herein by reference. Tray 116 supports a computer keyboard. Lid 112 is coupled to tray 116 for substantially covering the computer keyboard in a first position (not shown) and for providing a first writing surface in a second position (as in FIG. 1). Coupling between tray 116 and lid 112 may include, for example, a piano hinge. The interior surface of lid 112 provides the first writing surface. A corresponding exterior surface of lid 112 provides a second writing surface when lid 112 is in the first position and may be used to support reference books and papers.

Power controller 118 provides multiple outlets for supplying power to electronic equipment through one or more switches located on the power controller. Power controller 118 may include additional conventional circuits including, for example, circuits for line noise suppression, circuit breaking, voltage monitoring, voltage conversion, and load isolation.

Figure 2:
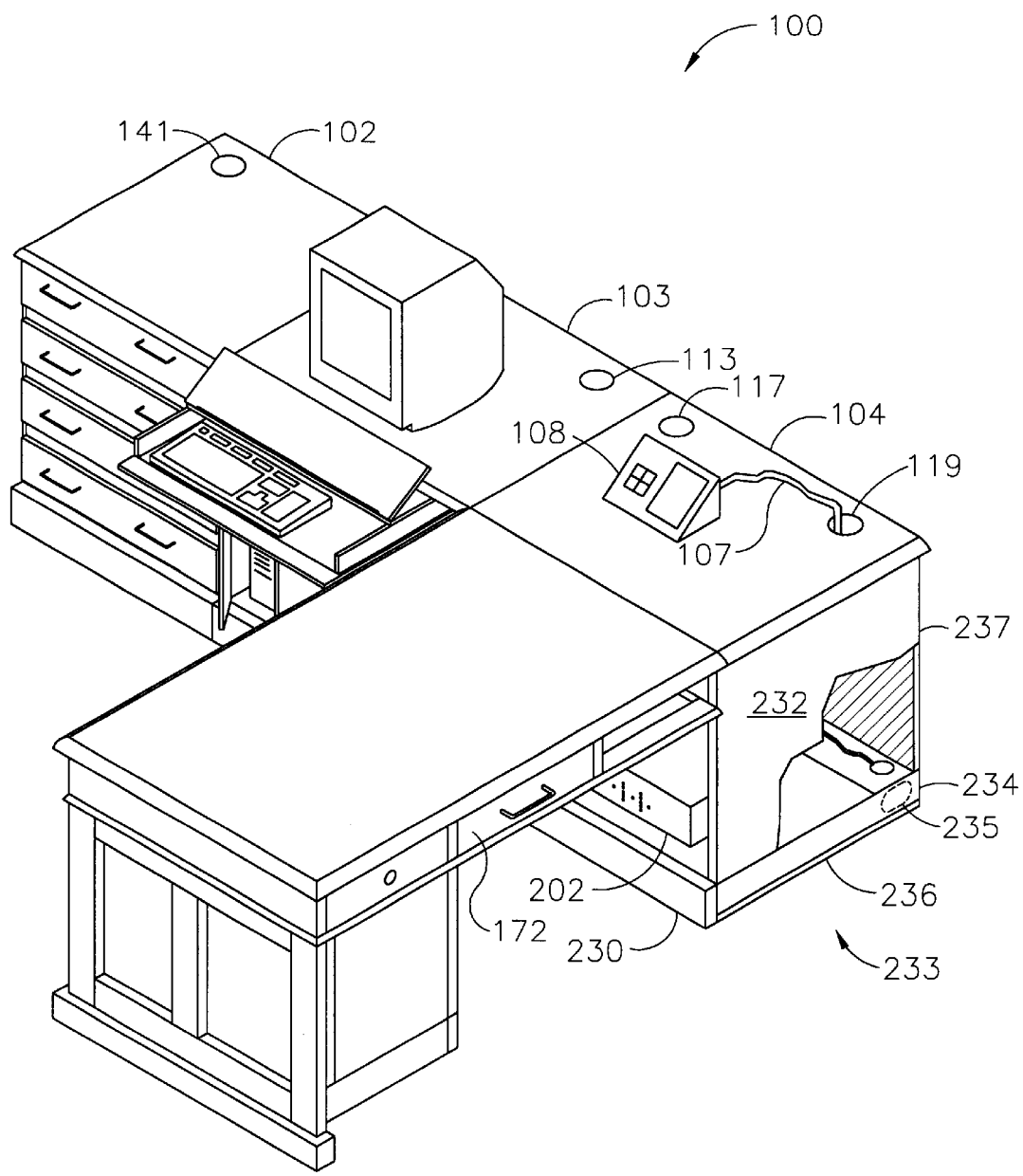
FIG. 2 is a perspective plan view of the furniture system of FIG. 1 from another point of view.
Figure 3:
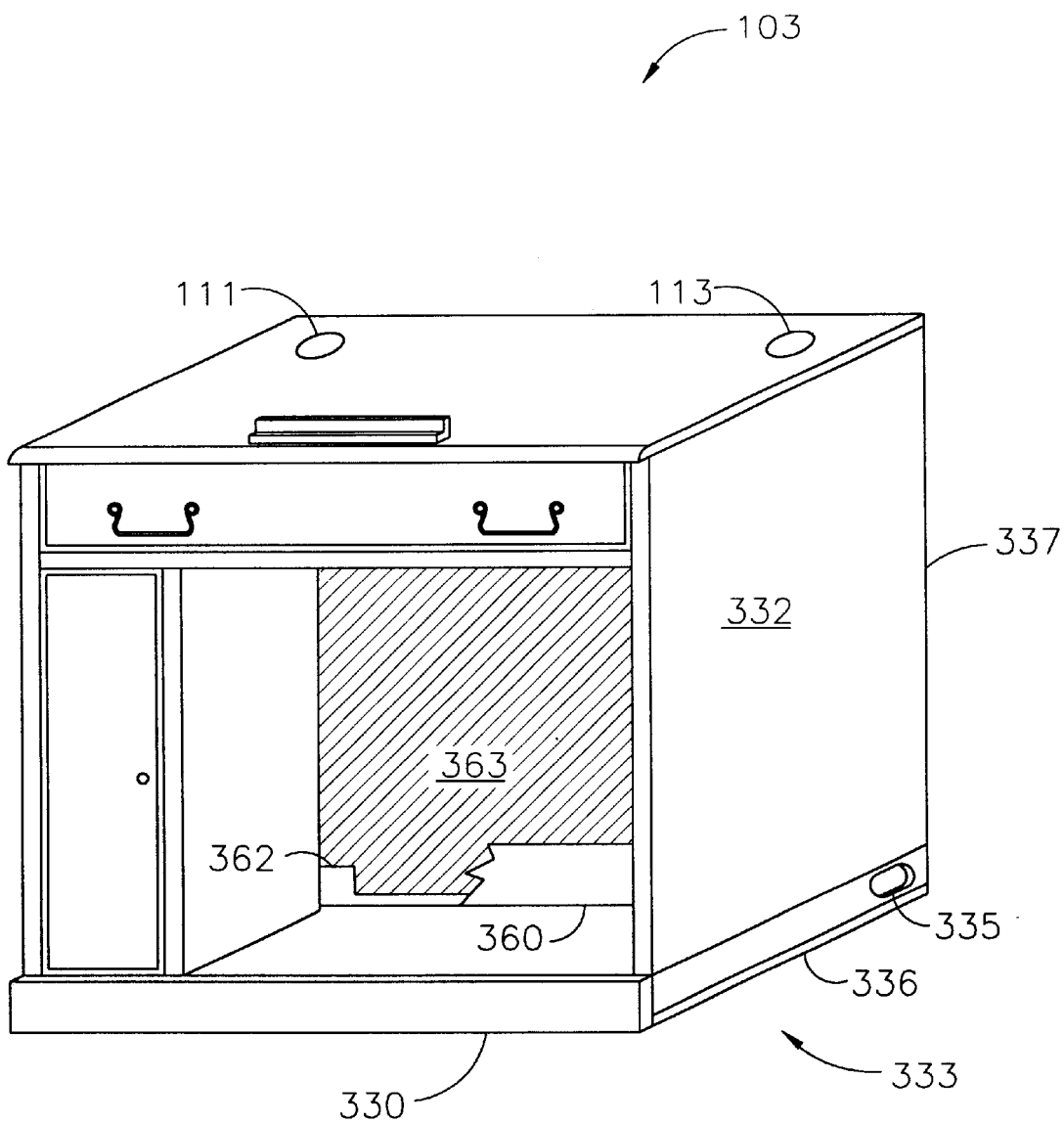
FIG. 3 is a front perspective view of a base module for supporting a computer in the furniture system of FIG. 1.

Base 104 includes footer 230 and exposed side 233 (see FIG. 2). Exposed side 233 (i.e., surface 232) includes side panel 237 and block 236. An aperture 235 in side panel 237 is covered by cover 234. The side of base 102 opposite exposed side 233 (not shown) is constructed in an identical manner with an aperture and provision for a cover; however, such a cover is omitted when cabling (e.g., power cords, wiring, or signal cables) must pass between base modules 102 and 103 to complete the installation of system 100. Base 104 supports telephone equipment 108 having a cable 107 that passes through aperture 119 to connect to a wall mounted jack located (for purposes of this discussion) behind base 102. Base 104 also supports desk 105.

Desk 105 is supported on an integral wall 170 and on base 104. Desk 105 includes identical and symmetric features (e.g., drawers 171 and 172) so that it may be used in an equivalent fashion from either side. Rolling drawer file 106 may be omitted or may be rolled about and placed for access from the opposite side of desk 105. In an alternate desk (not shown) wall 170 may be constructed as an exposed side as discussed above having an outer surface, an aperture for cable passage, and a cover. With the cover removed, power and signal cables from external equipment (e.g., a floor lamp) may access power controller 118, facility power receptacles, or facility signal jacks located behind other modules of furniture system 100. Likewise, power and signal cables from equipment supported by furniture system 100 may be routed through wall 170 to facility power receptacles or signal jacks located beyond the perimeter of furniture system 100.

As shown, base 102 is placed against base 103 so that an outside surface of each abuts at interface 140. Apertures in each abutting surface are aligned at interface 140 for passage of power and/or signal cables. Likewise, base 104 is placed against base 103 so that an outside surface of each abuts at interface 150. Apertures in each abutting surface are aligned at interface 150 for passage of power and/or signal cables. In the installation discussed above, telephone equipment 108 is connected to a facility signal jack by cable 107 that passes through aligned apertures at interface 150 and aligned apertures at interface 140. A power cable from computer chassis 202 passes through aligned apertures at interface 150 to connect to power controller 118.

Bases 102, 103, and 104 may support a conventional hutch to provide, for example, additional shelving, open or covered storage, support for lighting, and support for other electronic equipment. Wiring and cables may pass vertically from each hutch though notched shelving and/or one or more respective apertures 141, 142, 111, 113, 117, or 119 for routing between furniture modules (e.g., different base units or hutches) as discussed above.

A footer includes any structural or trim piece located at the lower front extremity of a furniture module. For example, footers 130, 230, and 330 are trim pieces located at the lower front faces of bases 102, 104, and 103, respectively. Note that footers 130 and 330 meet without a noticeable gap at interface 140; and, footers 330 and 230 meet without a noticeable gap at interface 150. The aesthetic effect of a continuous piece of furniture is obtained whether or not covers on side surfaces at an interface are omitted or installed in part because covers may be installed without increasing the overall width of a furniture module, according to various aspects of the present invention.

A cover, according to various aspects of the present invention, includes any structure that appears to be integral to an outer surface when installed. An outer surface, according to various aspects of the present invention, maintains a cover in position without fasteners and maintains an aesthetically pleasing appearance without noticeable discontinuity when the cover is removed.

Figure 4:
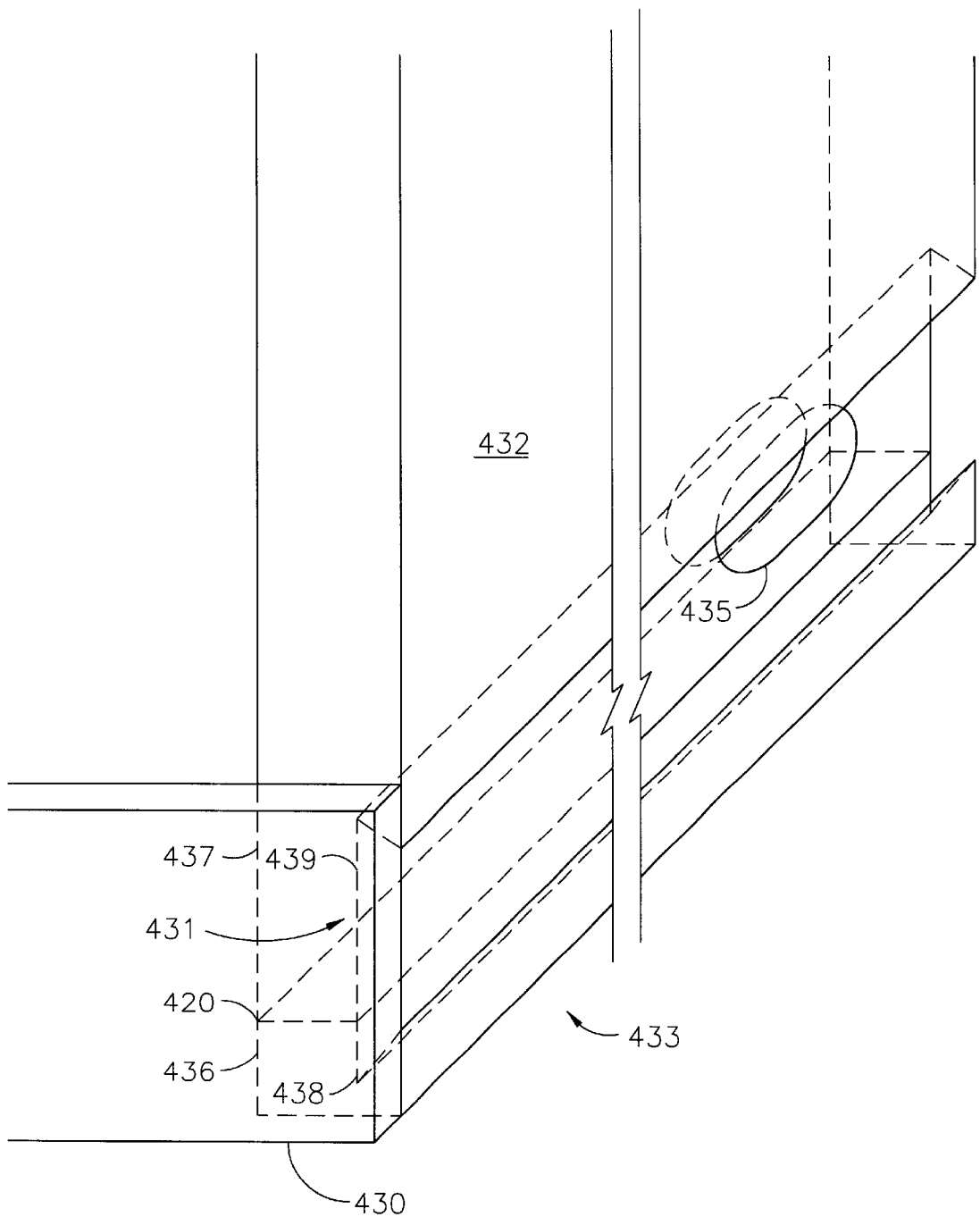
FIG. 4 is a front perspective view of a portion of a module according to various aspects of the present invention.
Figure 5:
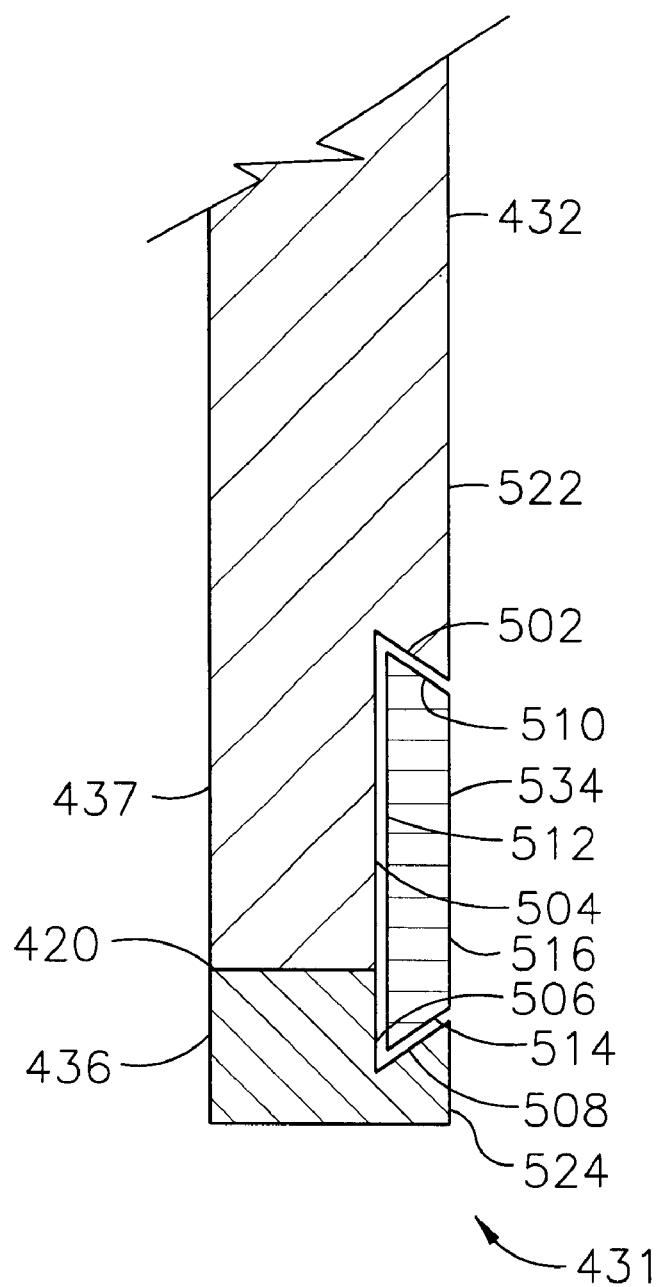
FIGS. 5, 6, 7, and 8 are cross section views of a channel portion of a module according to various aspects of the present invention.

A cover cooperates with an outer surface in any manner providing an integral appearance when installed. For example, the structure and operation of outer surfaces and covers discussed above may be of the type illustrated in FIGS. 4 and 5. Side 433 includes surface 432 comprising panel 437 and block 436. Aperture 435 permits passage of cabling through panel 437. Surface 432 includes channel 431 formed by notch 438 in block 436 and notch 439 in panel 437. Channel 431 is economically and reliably formed by the cooperation of notches 438 and 439. Block 436 and panel 437 are joined at interface 420 by any conventional technique after each has been machined to form the respective notch. By an alternate assembly sequence, block 436 is joined to panel 437 and a dove-tail channel is then cut. Footer 430 covers the front end of channel 431. The rear end of channel 431 is open for the insertion and removal of a cover, as discussed above.

With footer 430 removed for purposes of this discussion, cover 534 is seen to occupy channel 431. Distances between facing surfaces may appear exaggerated for convenience of illustration. Channel 431 holds cover 534 in place and permits sliding movement of cover 534 in channel 431 for installation and removal.

Figure 6:
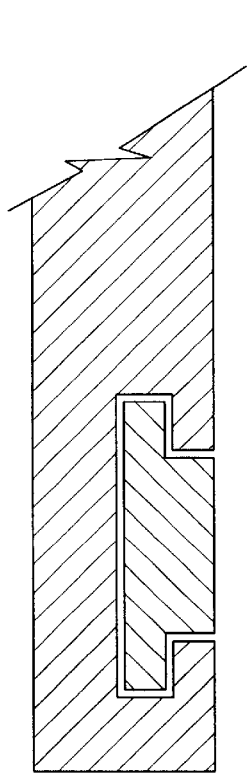
Figure 7:
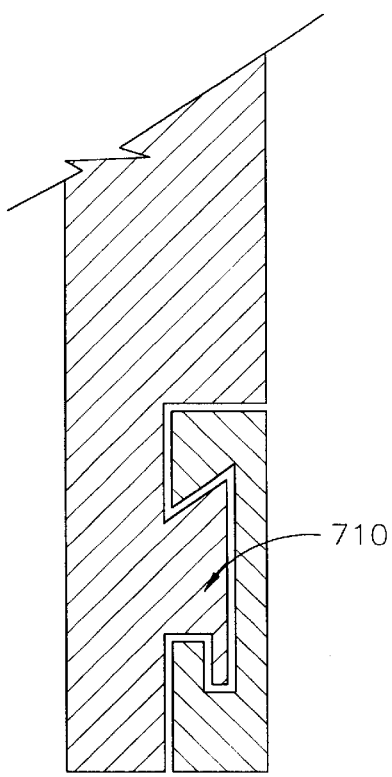
Figure 8:
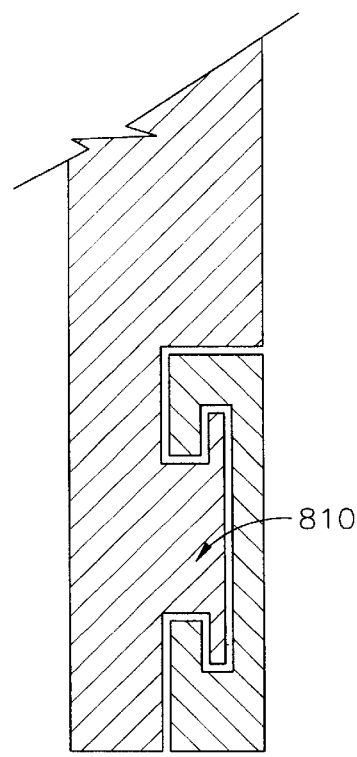

Outer surface 432 includes surfaces 522, 502 and 504 of panel 437; and surfaces 506, 508, and 524 of block 436. Surfaces 502, 504, 506, and 508 form channel 431. The orientation of surfaces for forming channel 431 may vary from that shown (e.g., almost any combination of straight or curved surfaces may be used) and still accomplish the aforementioned purposes of a channel and cover of the present invention. Channel 431 may have any grooved configuration for retaining cover 534 in place including for example, a dove-tail, circular, elliptical, trapezoidal, or rebetted configuration; or a combination or such configurations or their inverses, a few examples of which are shown in FIGS. 6 through 8. The raised portions 710 and 810 may be provided by attaching a rail or several knob pieces to the side panel portion. Covers may be formed of an integral piece as shown or from two or more pieces joined in any conventional manner. Although notches as shown are formed the full horizontal extent of outer surface 432, an alternate channel may be formed having notches that extend at least beyond the perimeter of hole 435. The orientation and placement of channel 431 may vary from the horizontal orientation near the bottom of each base module, as shown and discussed above. For example, channel 431 may be located at any convenient elevation that coordinates with the function or aesthetic design of the furniture system. Further, channel 431 may be oriented diagonally or vertically for sliding removal in a generally downward or upward motion. Channel orientation is less constrained when cover 534 can be installed without sliding, for example, as when bowed to snap into channel 431, as discussed below.

Cover 534 includes surfaces 510, 512, 514 and 516. When installed, surface 516 may be coplanar with surfaces 522 and 524 to complete an integral appearance. When cover 534 is formed of flexible material (e.g., plastic or laminate), cover 534 may be bowed and then snapped into channel 431 without sliding. Rear access to channel 431 may be omitted. Cover 534 need not nest precisely within channel 431 and may have any shape amenable to being retained and removed from the channel.

Figure 9:
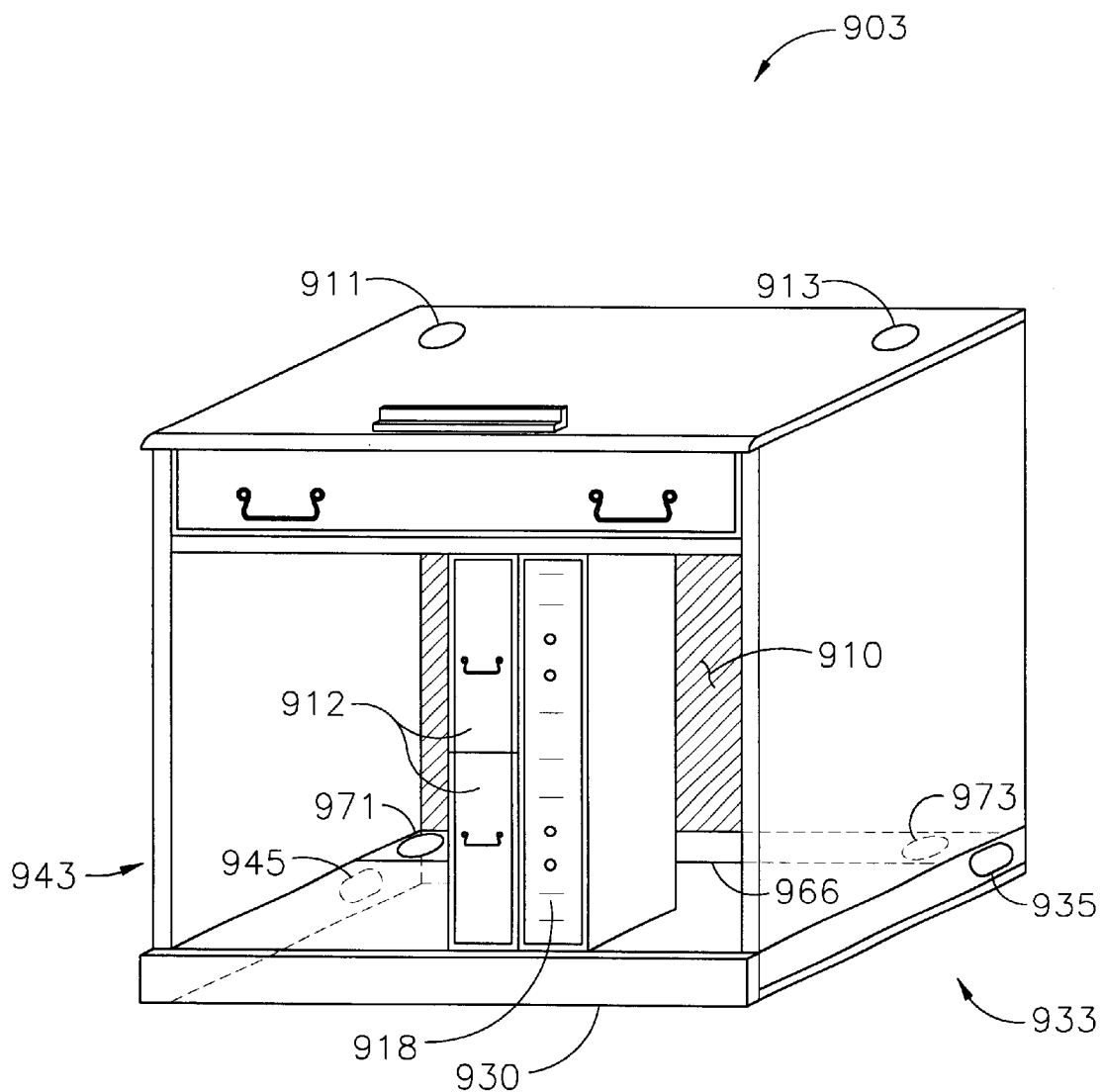
FIG. 9 is a front perspective view of an alternate base module.

Bases 102, 103, 104 and 903 of FIG. 9 respectively include several features that simplify installation and reconfiguration of cables and wiring including (a) one or more openings (e.g., 362 in back panel 363, 910) for entry/exit of power and/or signal cables; (b) a coverable passageway (e.g., 335, 935 and, 945) in each side (e.g., 333, 933, and 943); (c) covers (e.g., 134, 234) for passageways; (d) an area for routing or stowing wiring or cables (e.g.,129, or under panels 239, 360, or 966); (e) a lower cover (e.g., 360, 966) for covering the routing/showing area; (f) cable access apertures 219, 971, and 973 in lower cover (e.g., 360 and 966); and (g) apertures (e.g., 111, 113, 911 and 913) for vertical cabling or wiring.

Openings in back panels may be located at any convenient horizontal or vertical position. Symmetric location of two such openings near coverable passageways and cable access apertures is preferred. Symmetrical location of passageways permits mixing base modules in any order. Lower covers may be provided across any portion of the area. Such covers may be removable, or hinged in any conventional manner. Any suitable wire or cable restraints may be used (e.g., clips, retraction devices, bundling devices, or channels).

Any portion of bases 103 and 903 may be further divided with shelving for covered or uncovered storage. For example, base 903 includes drawers 912 and power controller 918 (similar to power controller 118).

A method of installing a modular furniture system according to various aspects of the present invention includes the steps of (a) planning access to facility power receptacles and signal jacks; (b) removing covers on outer surfaces that will meet at interfaces; (c) installing covers on outer surfaces that will not meet at interfaces; (d) storing covers in an area for routing and storing cables; (e) placing each module so to form various interfaces until all modules are placed in final position without obstructing facility power receptacles or signal jacks (temporary removal of one or more panels, shelves or drawers in some types of modular bases may be desirable); (f) installing (or reinstalling) any panels, shelving, or drawers as desired; (g) installing any equipment as desired on or in one or more modules; and (h) routing power and signal cables through apertures at interfaces as needed to support equipment location or relocation. Note that furniture modules may be placed once in final position and all cabling made necessary by the type or location of equipment may be accomplished without moving any furniture modules.

As discussed above by example, furniture modules may include floor-standing and wall mounted structures including cabinetry and overstuffed structures that provide storage and/or support for equipment and/or personnel during use. Modules include any furniture that provides apertures intended to be aligned during installation. A cover for an aperture includes any structure for concealing the aperture or for making the aperture less noticeable.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A furniture system comprising a plurality of furniture modules arranged in abutting relationship wherein:
   a. each module comprises a first outer surface and a second outer surface, each outer surface comprising a respective channel and a respective aperture located within the respective channel;
   b. each interface between abutting modules comprises at least two outer surfaces positioned to align respective apertures of the outer surfaces for passage of provided cabling between modules of the system; and
   c. the system further comprises a plurality of covers each slidingly engaged in a respective outer surface not included at any interface to conceal the respective aperture.

2. The system of claim 1 wherein a cover of the plurality is removable from the rear of the module.

3. The system of claim 1 wherein a portion of a cover of the plurality is flush with the respective outer surface.

4. The system of claim 1 wherein:
   a. a channel and respective cover of the plurality cooperate along an axis of sliding motion; and
   b. a channel of the plurality is formed of two notched members joined along the axis.

5. The system of claim 1 wherein a respective channel comprises a rabbet.

6. The system of claim 1 wherein each module further comprises a respective footer, each footer for covering an end of a respective channel, the footers aligned to meet at the interface.

7. A furniture module comprising:
   a. a power controller;
   b. an outer surface comprising a channel and an aperture located within the channel, the aperture for passage of provided cabling into the module to connect to the power controller; and
   c. a cover slidingly engaged in the outer surface to conceal the aperture wherein:
      a. the channel and cover cooperate along an axis of sliding motion; and
      b. the channel is formed of two notched members joined along the axis.

8. The furniture module of claim 7 wherein the cover is removable from the rear of the module.

9. The furniture module of claim 7 wherein a portion of the cover is flush with the outer surface.

10. The furniture module of claim 7 wherein the channel comprises a rabbet.

11. The furniture module of claim 7 further comprising a footer for covering an end of the channel.

12. The furniture module of claim 7 further comprising:
   a. a tray for supporting a provided computer keyboard;
   b. a lid, hinged to the tray, for providing a first writing surface and a second writing surface.

13. A furniture module comprising:
   a. a desk top having a first and a second end, the desk top comprising a pedestal supporting the first end;
   b. a base for supporting the second end, the base having an outer surface comprising a channel and an aperture located within the channel, the aperture for passage of provided cabling into the module; and
   c. a cover slidingly engaged in the outer surface to conceal the aperture.

14. The furniture module of claim 13 wherein the cover is removable from the rear of the module.

15. The furniture module of claim 13 wherein a portion of the cover is flush with the outer surface.

16. The furniture module of claim 13 wherein:
   a. the channel and cover cooperate along an axis of sliding motion; and
   b. the channel is formed of two notched members joined along the axis.

17. The furniture module of claim 13 wherein the channel comprises a rabbet.

18. The furniture module of claim 13 further comprising a footer for covering an end of the channel.

19. The furniture module of claim 13 wherein the desk top further comprises:
   a. a first drawer extending from the desk top in a first direction; and
   b. a second drawer extending from the desk top in a second direction opposite the first direction.

20. The furniture module of claim 13 wherein the pedestal comprises a wall.

21. A method for installing a modular furniture system, the system comprising a plurality of modules to be arranged in abutting relationship defining a plurality of interfaces, each module comprising:
   a. two sides, each side for abutting at an interface of the plurality of interfaces;
   b. a respective aperture in each side;
   c. a respective cover supported in sliding relation to the respective side for covering the respective aperture; and
   d. a cable stowage area; wherein the method comprises:
      assuring that each cover is removed on respective sides that will meet at an interface of the plurality of interfaces and that each cover is installed on respective sides that will not meet at an interface of the plurality of interfaces;
      after the step of assuring, placing each module so to form the interfaces;
      obtaining access to the cable stowage area; and
      via the cable stowage area, routing provided cables through respective apertures at the interfaces.

\* \* \* \* \*